US011939694B2

(12) United States Patent
Konstant et al.

(10) Patent No.: US 11,939,694 B2
(45) Date of Patent: Mar. 26, 2024

(54) METHOD FOR COATING A COMPONENT OF A TURBOMACHINE

(71) Applicant: MTU Aero Engines AG, Munich (DE)

(72) Inventors: Christoph Konstant, Hohenlinden (DE); Stefan Mayr, Friedberg (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/825,413

(22) Filed: May 26, 2022

(65) Prior Publication Data

US 2022/0380931 A1 Dec. 1, 2022

(30) Foreign Application Priority Data

May 31, 2021 (DE) ..................... 10 2021 113 999.6

(51) Int. Cl.
*C25F 3/14* (2006.01)
*F01D 25/00* (2006.01)

(52) U.S. Cl.
CPC ................ *C25F 3/14* (2013.01); *F01D 25/00* (2013.01); *F05D 2230/90* (2013.01)

(58) Field of Classification Search
None
See application file for complete search history.

(56) References Cited

U.S. PATENT DOCUMENTS

| | | | | |
|---|---|---|---|---|
| 9,272,306 B2 | 3/2016 | Ryabova et al. | | |
| 2012/0315381 A1* | 12/2012 | Mergner | .............. | B01J 37/0215 118/712 |

FOREIGN PATENT DOCUMENTS

| | | | | |
|---|---|---|---|---|
| DE | 2222009 A1 | 11/1973 | | |
| DE | 2904176 A1 | 8/1980 | | |
| DE | 19623495 A1 | 12/1997 | | |
| DE | 69518732 T2 | 5/2001 | | |
| DE | 102006042632 A * | 3/2008 | ............... | B05C 3/04 |
| DE | 102006042632 A1 | 3/2008 | | |
| DE | 102007026442 A1 | 12/2008 | | |
| DE | 102010024224 A1 | 12/2011 | | |
| DE | 102013107497 A1 | 1/2015 | | |
| EP | 1762634 A1 | 9/2005 | | |
| EP | 1808511 A1 * | 7/2007 | ............. | C23C 18/02 |
| EP | 1808511 A1 | 7/2007 | | |
| WO | 2012162642 A2 | 11/2012 | | |

* cited by examiner

*Primary Examiner* — Louis J Rufo
(74) *Attorney, Agent, or Firm* — Hinckley, Allen & Snyder, LLP; David R. Josephs

(57) ABSTRACT

The present invention relates to a method for coating a component of a turbomachine in a bath, in which method, the component is partially immersed in the bath containing a coating material; the component is rotated at least intermittently around an axis of rotation, which lies outside of the bath, during the at least partial immersion; the component is at most immersed partially over and beyond the rotation.

15 Claims, 2 Drawing Sheets

METHOD FOR COATING A COMPONENT OF A TURBOMACHINE

BACKGROUND OF THE INVENTION

Figure 1:
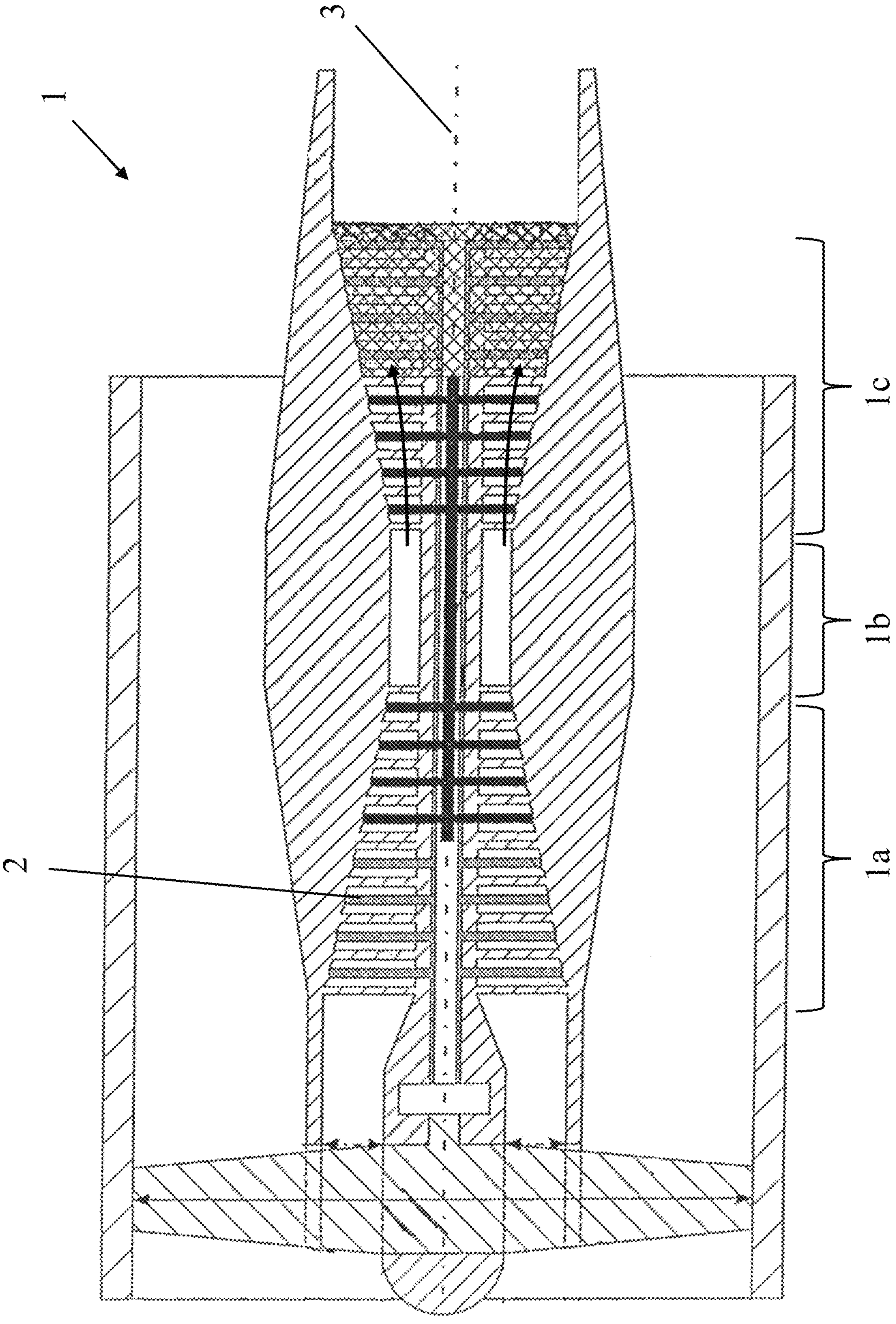

The present invention relates to a method for coating a component of a turbomachine.

The turbomachine may involve, for example, an aircraft engine, such as, for example, a turbofan engine. In functional terms, the turbomachine is divided into a compressor, a combustion chamber, and a turbine. In the case of an aircraft engine, for instance, inflow air is compressed by the compressor and undergoes combustion with admixed kerosene in the downstream combustion chamber. The hot gas that is formed, a mixture of combustion gas and air, flows through the downstream turbine and thereby undergoes expansion.

The method in question, for example, can relate to a component that is arranged in the completely assembled turbomachine or in the gas conduit thereof.

SUMMARY OF THE INVENTION

The present invention is based on the technical problem of presenting an especially advantageous method for coating a component of a turbomachine.

This is solved in accordance with the invention by the method according to the present invention. In this case, the component is immersed in a bath containing coating material, wherein, during the entire residence time in the bath, it remains only partially immersed; that is, it is never fully immersed. Furthermore, the component is rotated during the immersion operation and/or in the partially immersed state and done so, namely, around an axis of rotation that lies outside of the bath.

This way of carrying out the method, in particular the only partial immersion and the rotation of the component, can lead overall to a good coating result. The rotation of the component produces, for example, centrifugal forces that counteract, at least in part, the force of gravity and can prevent the still liquid coating material from flowing off or dripping off, such as, for example, from dripping off radially inward to a rotational position above the axis of rotation.

The surfaces that are to be coated can be coated, for example, more uniformly and with fewer flawed sites, while, at the same time, those surface regions that are not to be coated remain uncoated. This can lead to savings of material supplies, such as, for example, of coating material, and also of cleaning substances for removal of excess coating material; see below for details. It is also possible to simplify masking devices owing to the targeted coating or even to dispense with them altogether. The method can make possible a better accessibility of the surface, in particular in the case of components with complex geometries. In contrast, undercuts would be poorly accessible to spraying pistols for spraying on a coating and, in addition, the atomization could entail loss.

Preferred embodiments are found in the dependent claims and in the entire disclosure, whereby the description of the features does not always distinguish in individual instances between the device and method aspects or the use aspects; in any case, the disclosure is to be read implicitly in terms of all claim categories. If, for example, an advantage of a device is described in a certain application, this is to be understood at the same time as being a disclosure of a corresponding use.

The only partially immersed state of the component "over and beyond the rotation" also applies in the case of an integral consideration; that is, integrated over a complete rotation)(360° . If, for example, a segment, such as, for instance, a multiple blade segment that does not extend fully circumferentially is coated, it can be partially immersed to a rotating position "downward," but can no longer be immersed at all to an opposing rotating position "upward" (for example, following a rotation by 180° from the lower rotational position). On the other hand, however, the component can also extend fully circumferentially and, accordingly, be immersed partially over and beyond the entire circumference (over and beyond the circumference, the respectively immersed region then changes). In both cases, however, a subregion of the component remains uncoated after the full rotation.

In a preferred embodiment, the component is a rotating blade ring or a segment of a rotating blade ring. In general, the component can be, for example, an individual blade, but, preferably, it is a multiple segment or a blisk. In particular, the rotating blade ring or the multiple segment can be part of the fan, of the compressor, or of the turbine.

In a preferred execution of the method, the component is moved at least intermittently, in addition to the rotation, in a direction that at least partially lies axially. The axial direction corresponds to a direction that is parallel to the axis of rotation; especially preferably, the component is moved parallel to the axis of rotation. The overlap of the at least partial axial movement with the rotational movement can prevent—for example, on account of the shape of the airfoil profile of a blade—the inclusion of air bubbles in the coating material and consequently prevent splatters.

In accordance with a preferred embodiment, the angular velocity of the rotation can be changed at least intermittently; that is, it is not constant. In addition, the rotation can occur with an angular acceleration, which likewise can be changed.

In a preferred embodiment, the angular velocity of the rotation is at least intermittently constant (continual rotational movement without any change in angular velocity). In general, this can also be combined with a speed of rotation that can be changed intermittently; that is, the speed of rotation can be constant in one time interval and can change in another time interval. The speed of rotation can be changed, for example, during the immersion operation and afterwards be kept constant, or conversely. Alternatively, however, the speed of rotation can also be kept constant over the entire operation.

In accordance with a preferred execution of the method, the axis of rotation of the component is displaced in the vertical direction during the rotation, that is, it is moved in the vertical direction. Preferably, the component is situated at least intermittently in the immersed state during the vertical movement. As a result of the vertical displacement, the distance of the axis of rotation from the surface of the bath decreases or increases; that is, the component is immersed more or less deeply. The vertical movement of the axis of rotation occurs, for example, with a repeated change in direction, that is, with at least two changes in direction between the upward and downward movement.

In accordance with a preferred embodiment, the component is removed from the bath for drying while further maintaining the rotational movement. That is, it is further rotated both during removal and after it has been removed. This can promote, for example, the removal of excess coating material from the surface of the component. The coating material can also be better distributed, for example, and it is possible to prevent beading.

Preferably, for drying, a stream of air is directed onto the component, the stream of air having a velocity component that is directed opposite to the force of gravity. The stream of air can promote the drying process by way of forced convection, for example, and consequently improve the drying results. The alignment opposite to the force of gravity can thereby help to ensure a more uniform layer thickness and, for example, in turn prevent beading.

In accordance with a preferred embodiment, the speed of rotation of the component is successively reduced as the drying progresses after the removal from the bath. An adjustment of the speed of rotation can occur, for example, depending on the hardness state of the coating materials and on the layer thickness. As the drying progresses, the solvent content, in particular the water content, is reduced in the coating, for example, and the coating therefore becomes more viscous. Owing to a reduction in the speed of rotation, it is possible, for example, to take into account an ensuing change in the behavior of the layer.

In a preferred embodiment, coating material that has dripped off the component after it has been removed from the bath is returned to the bath, that is, is re-added in liquid state to the bath. This reuse can be of ecological and economic advantage, for example.

As mentioned at the beginning, the conduct of the procedure according to the invention, for example, can reduce the masking effort required during coating. However, in general, a certain masking can still be carried out in the case of a blade, for example, in that the blade root is masked, but the body of the blade remains unmasked. A seal or sealing plane of the masking can therefore lie, for example, on the blade platform between the blade root and the blade body. Accordingly, it is possible, for example, to prevent an unintended coating of the blade root even when the blade platform lies obliquely to the axis of rotation, that is, would only be immersed partially.

In a preferred embodiment, the axis of rotation lies at an angle at least intermittently, that is, it is not parallel to the surface of the bath. It can lie at an angle, for example, over and beyond the entire step (ii) and preferably also during the immersion/removal. By way of the angular positioning, it is possible, for example, to create an oblique coating edge (oblique in relation to the longitudinal axis of the turbomachine or of the engine); that is, for example, the coating edge can be adjusted to a just mentioned oblique blade platform (so that, among other things, masking is not needed any longer).

In accordance with a preferred execution of the method, the component is removed from the bath for drying after a first passage of the method steps (i) to (iii) and subsequently, in a second passage in accordance with the method steps (i) to (iii), again immersed in the bath and rotated, whereby, in the first passage and in the second passage, the operation is preferably carried out with opposite direction of rotation.

The above-described passages for coating the component can be repeated in order to achieve a desired layer thickness. It is possible to apply in succession a plurality of layers, which can contribute to an overall more uniform total thickness. In the case of a lower viscosity of the coating materials, for example, more repetitions of the passages may be required for a certain total thickness than in the case of a higher viscosity. In a preferred embodiment, the number of repetitions is at least 3 and, in order of mention, increasingly preferably at least 4, 5, or 6. Advantageous upper limits can lie, for example, at maximally 50, 40, or 30.

The invention also relates to a method for producing a component of a turbomachine, wherein the component is coated in accordance with the method steps (i) to (iii). In a subsequent processing of the component, the coating preferably serves as a mask and is removed once again after this subsequent processing. The coating can therefore serve, for example, as a lacquer, which can serve as a masking means.

In accordance with a preferred embodiment, the subsequent processing is, for example, an electrochemical method, such as, for example, one involving removal of material. It is possible, for example, to keep a region of the component surface, such as, for example, the blade tip, free of coating material or lacquer, after which the exposed component region can be partially removed and/or coated differently, that is, for example, furnished with cladding.

BRIEF DESCRIPTION OF THE DRAWING FIGURES

The invention will be explained in detail below on the basis of an exemplary embodiment, whereby the individual features in the scope of the dependent claims can also be a key part of the invention in other combinations and, here, too, no distinction is made in detail between the different claim categories.

Figure 2B:
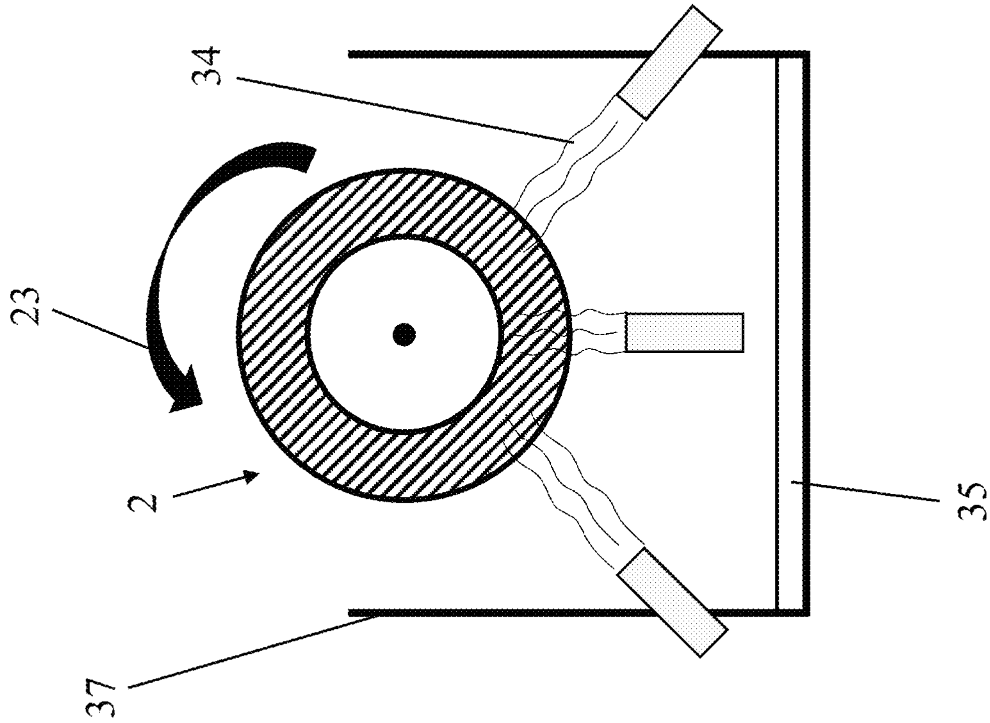
Figure 2A:
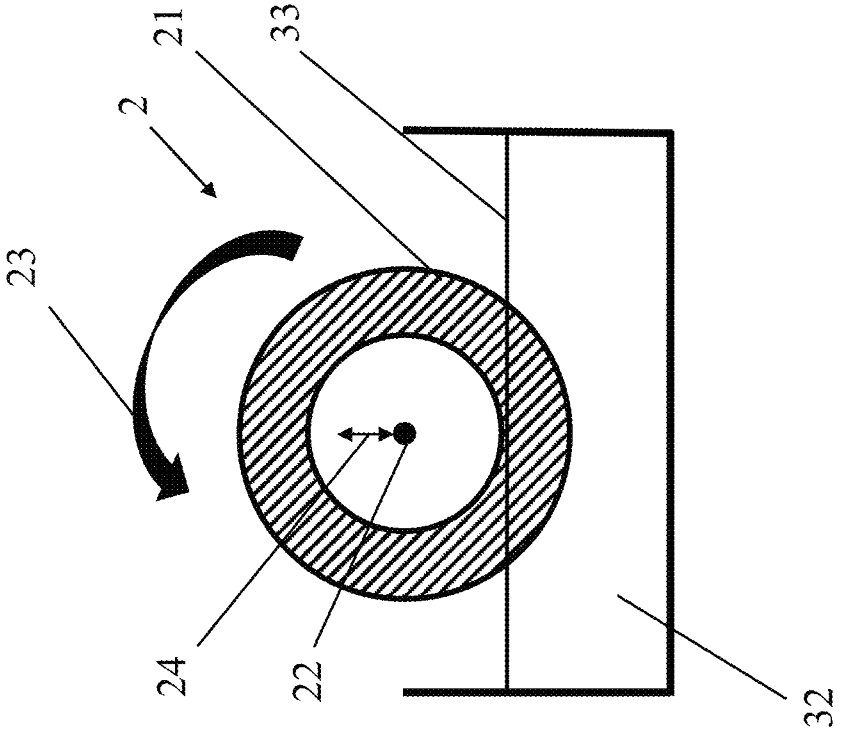

The present invention is shown in the accompanying figures:

FIG. 1 shows a turbomachine, specifically a turbofan engine, in a longitudinal section; and FIGS. 2*a, b* show a coating according to the invention of a component for a turbomachine in accordance with FIG. 1.

DESCRIPTION OF THE INVENTION

FIG. 1 shows a turbomachine 1, specifically a turbofan engine, in a longitudinal or axial section. The turbomachine 1 is functionally divided into a compressor 1*a*, a combustion chamber 1*b*, and a turbine 1*c*. Both the compressor 1*a* and the turbine 1*c* are each constructed of a plurality of stages, with each stage consisting of a guide vane ring and a rotating blade ring. During operation, rotating blade rings rotate around the longitudinal axis 3 of the turbomachine 1. In the compressor 1*a*, the inflow air is thereby compressed and then undergoes combustion with admixed kerosene in the downstream combustion chamber 1*b*. The hot gas undergoes expansion in the turbine 1*c* and drives the rotating blade rings. The reference number 2 refers, by way of example, to a compressor rotating blade ring in a blisk construction design.

FIGS. 2*a* and 2*b* show, in schematic illustration, the coating according to the invention of a component 2, which, in this example, involves a compressor blade ring in a blisk construction design. During the coating, the component 2 is immersed in a bath 33 containing liquid lacquer as the coating material 32.

During the immersion, the component 2 is rotated around an axis of rotation 22 that lies outside of the bath. The reference number 23 refers to the direction of rotation of the component 2, whereby the component 2 can be rotated constantly or can also experience intermittently an angular acceleration. In the partially immersed state, the component is rotated further; optionally, it can additionally be moved vertically upward and downward, as indicated by the reference number 24.

However, the component 2 is not fully immersed over the entire circumference, not even integrated over the circumference. The ensuing, only partial coating of the component 2 with the coating material 32 is highlighted by the cross-hatched area 21, with a middle region of the component 2 remaining uncoated. Furthermore, the component 2 can additionally be moved optionally axially in the immersed state (not depicted), that is, in the present case, perpendicular to the plane of the drawing.

In accordance with FIG. 2*b*, the component 2 was taken from the bath 33 for drying and, afterwards, it is further rotated; see the direction of rotation 23. From the blower nozzles shown, a respective stream of air 34 with a velocity component opposite to the force of gravity is directed onto the component 2. Coating material 35 that has dripped off the component 2 is collected in a drip collecting tank 37 and is returned to the bath 33 and thereby reused. As the drying progresses, it is possible to reduce the speed of rotation of the component 2 successively to a standstill.

What is claimed is:

1. A method for coating a component of a turbomachine in a bath, comprising the steps of:

i) partially immersing the component in the bath containing a coating material;

ii) rotating the component at least intermittently around an axis of rotation, which lies outside of the bath, during the at least partial immersion; the component having a radially inner region proximal to the axis of rotation and a radially outer region distal to the axis of rotation;

iii) immersing the radially outer region of the component at most partially; and wherein the coating serves as a mask in a subsequent processing of the component and is removed after subsequent processing.

2. The method according to claim 1, wherein the component is a rotating blade ring or a segment of a rotating blade ring.

3. The method according to claim 1, wherein the component is additionally moved in step (ii) at least intermittently in a direction that lies at least partially axially.

4. The method according to claim 1, wherein the angular velocity of continued rotation of the component is changed at least intermittently.

5. The method according to claim 1, wherein the angular velocity of the rotation is constant at least intermittently.

6. The method according to claim 1, wherein, during the at least intermittent rotation, the axis of rotation is moved in a vertical direction, wherein, during the vertical movement, the component is found in an immersed state at least intermittently.

7. The method according to claim 1, wherein the axis of rotation is oriented at an oblique angle to the surface of the bath at least intermittently.

8. The method according to claim 1, wherein the component is rotated further during removal from the bath as well as after it has been removed from the bath.

9. The method according to claim 8, wherein the speed of rotation of the component is successively reduced after it has been removed from the bath as the drying progresses.

10. The method according to claim 8, wherein the coating material that drips off the component after it has been removed from the bath is returned in a liquid state to the bath.

11. The method according to claim 8, wherein the component is removed from the bath for drying.

12. The method according to claim 8, further comprising the step of:

directing a stream of air onto the component from below the component; the stream of air having a velocity component that is opposite to the force of gravity.

13. The method according to claim 1, wherein the component is removed from the bath for drying following a first passage through the method steps i) to iii), wherein, afterward in a second passage in accordance with the steps i) to iii), the component is again immersed in the bath and rotated, wherein, in the first passage and in the second passage, rotation takes place in opposite directions of rotation.

14. The method according to claim 1, wherein the subsequent processing is an electrochemical method.

15. The method according to claim 1, wherein the speed of rotation of the component is successively reduced after it has been removed from the bath as the drying progresses.

* * * * *